United States Patent [19]
Balentine, III

[11] Patent Number: 4,920,464
[45] Date of Patent: Apr. 24, 1990

[54] BICYCLE BRAKE LIGHT

[76] Inventor: Alfred Balentine, III, 1616 Kemble, N. Chicago, Ill. 60064

[21] Appl. No.: 390,977

[22] Filed: Aug. 7, 1989

[51] Int. Cl.⁵ .............................................. B62J 6/00
[52] U.S. Cl. ..................................... 362/72; 340/432; 362/251; 362/394
[58] Field of Search ............... 362/721, 193, 251, 394, 362/802, 234; 340/432, 479

[56] References Cited

U.S. PATENT DOCUMENTS

| | | |
|---|---|---|
| 3,878,387 | 4/1975 | Kovacic ........................ 340/532 X |
| 3,906,443 | 9/1975 | Musselman ........................ 340/432 |
| 4,031,343 | 6/1977 | Sopko ................................ 200/61.12 |
| 4,204,191 | 5/1980 | Daniels .............................. 340/432 |
| 4,395,603 | 7/1983 | Lanzier ............................ 200/61.87 |
| 4,586,021 | 4/1986 | Nickols ............................ 340/432 |

Primary Examiner—Stephen F. Husar
Attorney, Agent, or Firm—Leon Gilden

[57] ABSTRACT

A bicycle brake light arrangement is set forth utilizing an included battery and signaling lamp mounted on an associated bicycle frame with a switch member mounted on a brake caliper to complete an electrical circuit to actuate the associated lamps.

9 Claims, 4 Drawing Sheets

BICYCLE BRAKE LIGHT

BACKGROUND OF THE INVENTION

1. Field of the Invention

The field of invention relates to bicycle brake lights, and more particularly pertains to a new and improved bicycle brake light wherein the brake light system is actuated upon braking of the associated bicycle.

2. Description of the Prior Art

The use of bicycle brake lights in association with brake calipers is well known in the prior art. Heretofore, the adjustment of the switching arrangement relative to the brake light has been of a relatively complex arrangement, as opposed to the instant invention which enables fine adjustment of the switching member. Further, the prior art brake lights have been of conventional configuration as incorporated by the instant invention, but wherein the instant invention proceeds to provide an aerial brake light for enhanced visibility. For example, U.S. Pat. No. 3,878,387 to Kovacic sets forth a brake light system wherein the switching member is mounted relative to a caliper arm or lever to complete the circuit, as opposed to the instant invention positioning the brake light upon a stable portion of the caliper on an opposite side of the caliper pivot axle.

U.S. Pat. No. 3,906,443 to Musselman sets forth a brake light circuitry wherein the switching member is actuated by contacts positioned through the brake shoe pad holder assembly. This arrangement encourages rapid wear of such contacts in its association with a bicycle wheel rim.

U.S. Pat. No. 4,031,343 to Sopko sets forth a bicycle brake light wherein the switch is provided and arranged on the caliper arms remote from the brake pads, but fails to provide the adjustability and stability of the instant invention as the switch is pivoted in its entirety with the cable, as opposed to the instant invention where the cable reciprocates through the switch.

U.S. Pat. No. 4,586,021 to Nickols sets forth a brake light wherein the switching member for the brake light is located between an arm of the caliper brake mechanism and the rear wheel yoke in a configuration remote from that of the instant invention.

As such, it may be appreciated that there is a continuing need for a new and improved bicycle brake light wherein the same addresses both the problems of ease of adjustment and effectiveness in use, and in this respect, the present invention substantially fulfills this need.

SUMMARY OF THE INVENTION

In view of the foregoing disadvantages inherent in the known types of bicycle brake lights now present in the prior art, the present invention provides a bicycle brake light wherein the same utilizes a switch fixedly mounted between opposed fixed arms of a single lever arm of the bicycle caliper in cooperation with the relatively movable arm and further provides for ease of adjustment of the switch mechanism to accommodate brake pad wear. As such, the general purpose of the present invention, which will be described subsequently in greater detail, is to provide a new and improved bicycle brake light which has all the advantages of the prior art bicycle brake lights and none of the disadvantages.

To attain this, the present invention comprises a bicycle brake light wherein the same utilizes a switch member mounted between spaced arms of a first lever of a bicycle brake caliper mechanism in cooperation with the other relatively movable arm. The switch member accommodates the brake cable to be reciprocated therethrough with an internal adjustment cam to adjust a second contact relative to a first movable contact secured to the brake cable. A rear brake light may be mounted to the bicycle frame mechanism and used alone or in combination with an antennae light formed of a flexible, polymeric material with a transparent housing secured at its uppermost end with a light mechanism therein electrically associated with the switching mechanism and a self-contained battery.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle brake light which has all the advantages of the prior art bicycle brake lights and none of the disadvantages.

It is another object of the present invention to provide a new and improved bicycle brake light which may be easily and efficiently manufactured and marketed.

It is a further object of the present invention to provide a new and improved bicycle brake light which is of a durable and reliable construction.

An even further object of the present invention is to provide a new and improved bicycle brake light which is susceptible of a low cost of manufacture with regard to both materials and labor, and which accordingly is then susceptible of low prices of sale to the consuming public, thereby making such bicycle brake light economically available to the buying public.

Still yet another object of the present invention is to provide a new and improved bicycle brake light which provides in the apparatuses and methods of the prior art some of the advantages thereof, while simultaneously overcoming some of the disadvantages normally associated therewith.

Still another object of the present invention is to provide a new and improved bicycle brake light wherein the same utilizes an adjustable switch mechanism in cooperation with a signal brake light system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
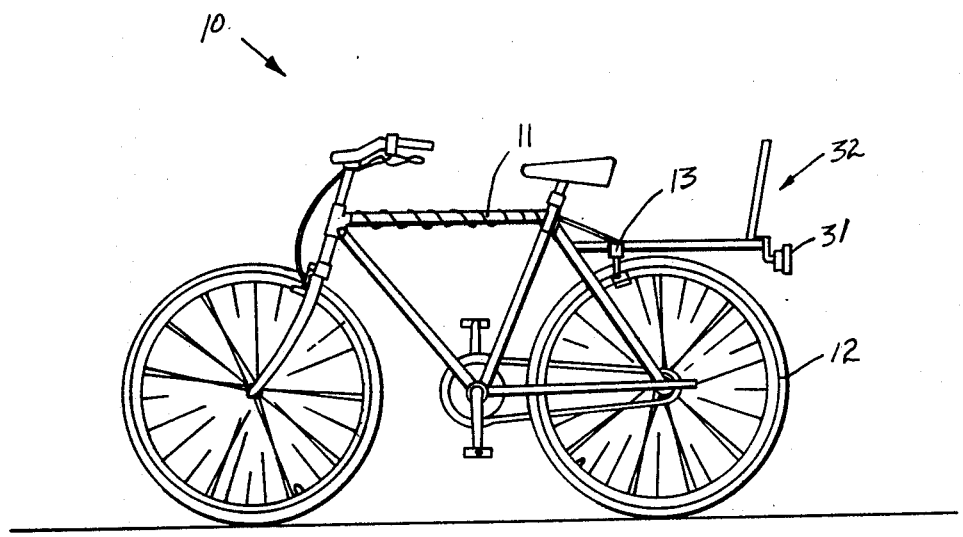
FIG. 1 is an orthographic view taken in elevation of a bicycle in combination with the brake light mechanism of the instant invention.

With reference now to the drawings, and in particular to FIGS. 1 to 8 thereof, a new and improved bicycle brake light embodying the principles and concepts of the present invention and generally designated by the reference numeral 10 will be described.

Figure 2:
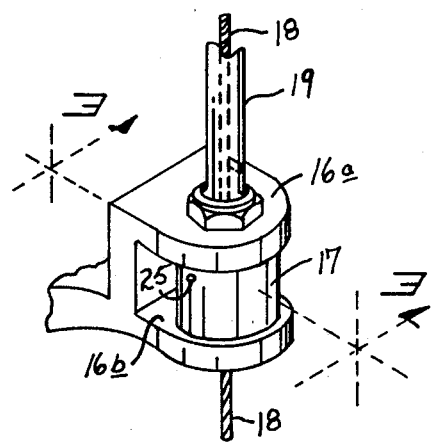
FIG. 2 is an isometric illustration, somewhat enlarged, of the switch mechanism.
Figure 3:
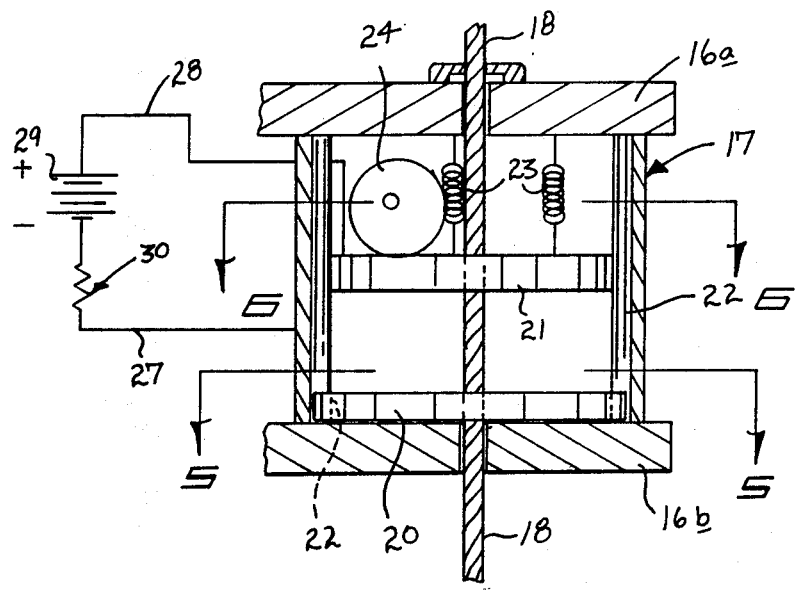
FIG. 3 is an orthographic view taken along the lines 3—3 of FIG. 2 in the direction indicated by the arrows.
Figure 4:
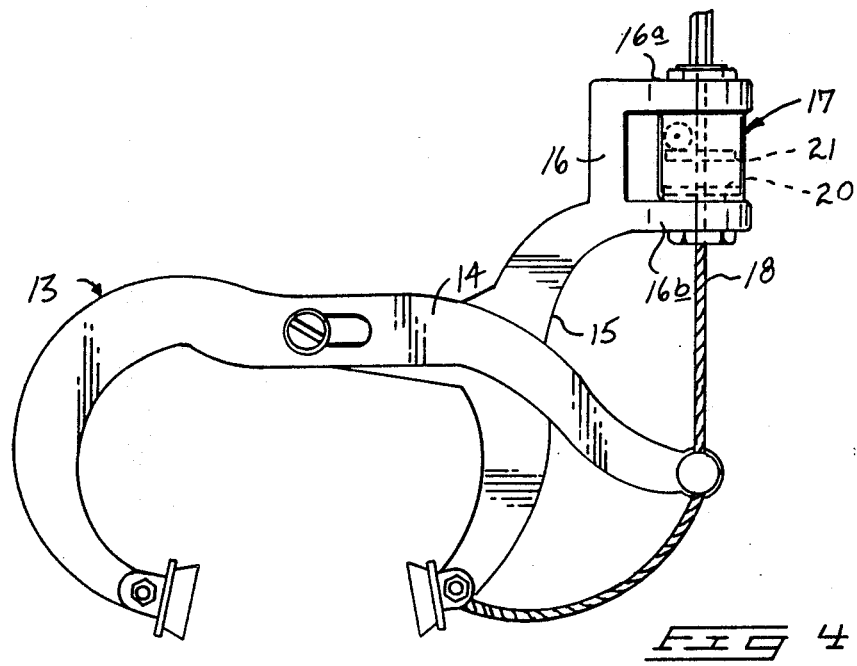
FIG. 4 is an orthographic view taken in elevation of the switch mechanism in association with a bicycle brake caliper.
Figure 5:
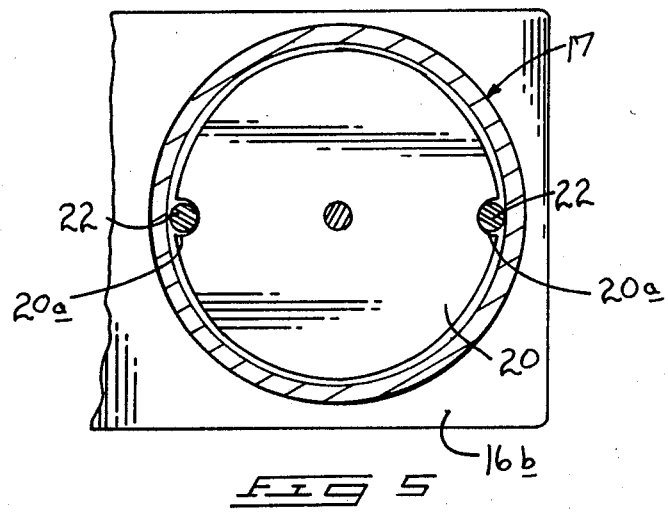
FIG. 5 is a orthographic view taken along the lines 5—5 of FIG. 3 in the direction indicated by the arrows.
Figure 6:
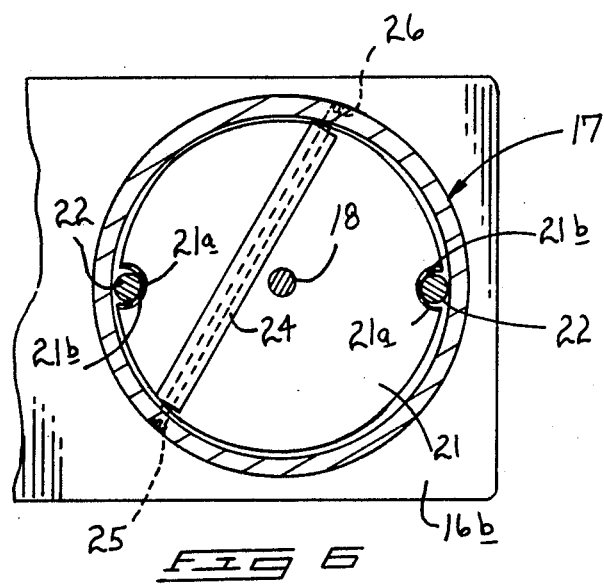
FIG. 6 is an orthographic view taken along the lines 6—6 of FIG. 3 in the direction indicated by the arrows.
Figure 7:
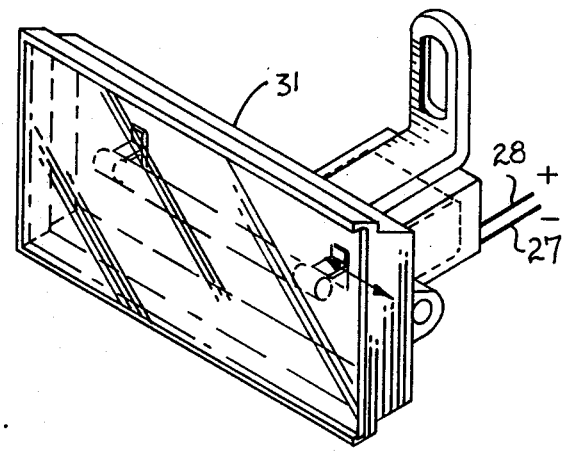
FIG. 7 is orthographic cross-sectional view of brake light as utilized by the instant invention.

More specifically, the bicycle brake light apparatus 10 of the instant invention essentially comprises a combination with a conventional bicycle 11 formed with a forward wheel and a rear wheel 12 with a brake caliper 13 mounted in operative engagement with the rear wheel. Reference to FIG. 2 illustrates the caliper 13 with a first caliper arm 14 pivotally mounted about a central caliper pivot to a second caliper arm 15. The second caliper arm 15 includes a "U" shaped leg remote from the bracket pad arrangement on an opposite side of the caliper pivot. The "U" shaped leg 16 includes an upper and lower leg 16a and 16b respectively spaced a fixed and parallel distance apart relative to one another. A switch 17 is mounted between the upper and lower legs 16a and 16b and receives the brake cable 18 reciprocatably therethrough with the brake cable fixedly mounted relative to the upper leg 16a via a cable guide 19 to direct the cable 18 therethrough.

Figure 8:
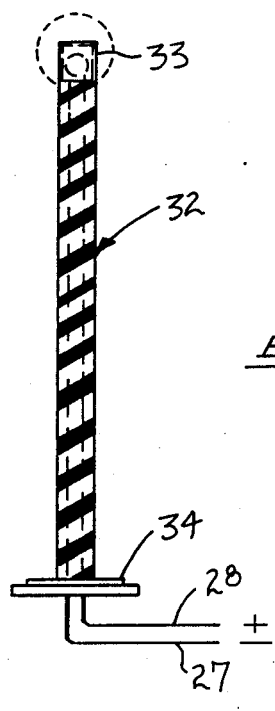
FIG. 8 is an orthographic cross-sectional view of an antennae brake light as utilized by the instant invention.

Switch 17 includes a first reciprocating contact 20 fixedly secured to the cable 18 with diametrically opposed arcuate recesses 20a formed within the perimeter surface of the reciprocating cylindrical first contact 20 to receive guide ribs 22 that are electrically conductive and are mounted parallel to one another onto interior diametrically opposed surfaces of the cylindrical housing of the switch 17. A second contact 21 is adjustably mounted relative to an upper end of the switch housing with a single or plurality of return springs 23 to bias the second contact away from the first contact 22. The second contact slidably receives the brake cable therethrough. An elongate adjustment cam 24 is mounted rotatably above the second contact 21 and is rotated with a screw angle 25 formed with a forwardly positioned drive head that may include a screw driver fitting or a hexagonal recess to enable rotation of the screw axle 25. The axle 25 is fixedly secured to the adjustment cam 24 and is formed with a threaded rear terminal end portion 26 that is threaded through a rear wall of the housing of the switch 17 to enable rotation of the adjustment cam 24 by rotation of the forwardly mounted head that is accessible through a coaxially aligned opening through a cylindrical wall of the switch 17. The second contact 21 includes diametrically opposed arcuate second contact recesses 21a that are formed with an insulative layer to prevent electrical contact between the second switch 21 and the electrically conductive guide ribs 22. A first conductive wire 27 is in electrical communication with at least one guide rib 22 with a second conductive wire 28 in electrical communication with a second contact 21. Upon physical contact of the two electrical contacts 21 and 22, a circuit is effected through an associated battery 29 of a conventional dry cell configuration positioned as desired within the bicycle framework and thereby actuate lights 30 formed within the circuit. A first light 31 is formed with a forward transparent lens and a rearwardly positioned securement bracket for securement to a rear portion of the bicycle 11, as illustrated in FIG. 1 for example. FIG. 8 is illustrative of a second brake light that is optionally employed by the instant invention and utilizes a mounting bracket 34 to support an upwardly extending cylindrical resilient tubular rod 32 formed with a transparent lens cap 33 at its upper terminal end with associated electrical wires 27 and 28 directed coaxially of the resilient tubular rod 32. An included illumination bulb is actuated upon completion of the electrical circuit, as noted above. The resilient character of the tubular rod 32 accommodates impact with the light during conventional use of the bicycle.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle brake light apparatus in combination with a bicycle including a bicycle framework having secured thereto a plurality of spaced wheels with at least one brake caliper member in operative association with at least one of said wheels, the caliper member including first and second spaced brake engagement members secured to forward ends of pivotally arranged first and second caliper arms, and the first caliper arm including a switch member,
   wherein the switch member includes first and second contact members, and the switch member is fixedly mounted on a rear terminal end of the first caliper arm, and
   a brake cable fixedly mounted to a rear terminal end of the second caliper arm and reciprocatably received to the switch member, and
   a light means in electrical communication with the switch member for illumination upon physical contact of the first contact with the second contact within the switch member, and
   a battery in electrical communication with the switch member and the light means.

2. A bicycle brake light apparatus as set forth in claim 1 wherein the rear terminal end of the first caliper arm includes a "U" shaped leg formed with spaced upper and lower legs arranged parallel to one another, and the switch member fixedly secured between the upper and lower spaced legs.

3. A bicycle brake light apparatus as set forth in claim 2 wherein the first contact member coaxially receives the brake cable therethrough, and the brake cable is fixedly mounted to the first contact member, and the second contact member is spaced above the first contact member and is biased towards an upper end of the switch member.

4. A bicycle brake light apparatus as set forth in claim 3 wherein the first contact member includes diametrically aligned arcuate recesses, and the switch member includes a cylindrical housing with elongate parallel ribs diametrically opposed and aligned relative to one another formed interiorly of the cylindrical housing, and each rib member is slidably received within each arcuate recess of the first contact member.

5. A bicycle brake light apparatus as set forth in claim 4 wherein the second contact member includes diametrically opposed arcuate recesses for receiving a respective rib within each recess.

6. A bicycle brake light apparatus as set forth in claim 5 including an elongate cam member operatively associated with an upper surface of the second contact member, and the cam member includes an axle therethrough, the axle includes a forward end formed with an adjustment head accessible through a coaxially aligned aperture directed through the cylindrical wall of the switch member and a rear end portion of the axle threadedly received within the cylindrical wall of the switch member to rotate the cam relative to the upper surface of the second contact member to vertically adjust the second contact member relative to the housing of the switch member.

7. A bicycle brake light apparatus as set forth in claim 6 wherein the light means includes a tubular flexible rod with a securement bracket at a lower terminal end thereof for securement to the bicycle framework and an upper terminal end supporting a transparent lens cap with an illumination bulb therein for illumination upon electrical association of the first contact and the second contact.

8. A bicycle brake light apparatus as set forth in claim 7 wherein the diametrically opposed arcuate recesses of the second contact member include insulation between the arcuate recesses and the elongate ribs.

9. A bicycle brake light apparatus as set forth in claim 8 wherein the elongate ribs are in electrical communication with the first contact member, and a first electrical wire is in operative association with at least one elongate rib, and a second electrical wire is in electrical association with a second contact member, and the first and second electrical wires form an electrical circuit with the battery and the light means.

* * * * *